W. SCHLOEMILCH.
RECEIVER FOR SPACE TELEGRAPHY.
APPLICATION FILED JAN. 3, 1906.
936,258.
Patented Oct. 5, 1909.
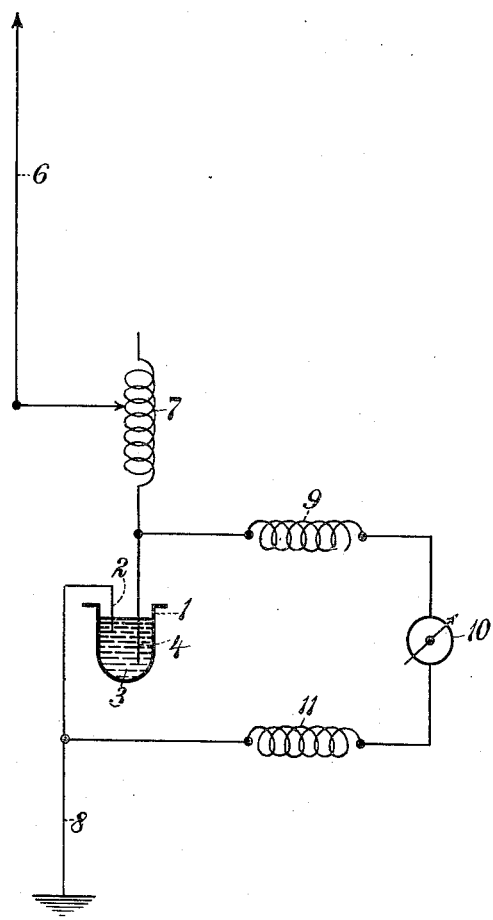

UNITED STATES PATENT OFFICE.

WILHELM SCHLOEMILCH, OF OBERSCHÖNEWEIDE, NEAR BERLIN, GERMANY.

RECEIVER FOR SPACE TELEGRAPHY.

936,258. Specification of Letters Patent. Patented Oct. 5, 1909.

Original application filed October 3, 1903, Serial No. 175,600. Divided and this application filed January 3, 1906. Serial No. 294,366.

*To all whom it may concern:*

Be it known that I, WILHELM SCHLOEMILCH, a subject of the Emperor of Germany, and a resident of Oberschöneweide, near Berlin, Germany, have invented certain new and useful Improvements in Receivers for Space Telegraphy, of which the following is a specification.

My invention relates to electrical space telegraphy commonly known as wireless telegraphy and has for its object to provide an improved receiver for detecting electrical oscillations.

The receiver which forms the subject-matter of my present application is of the electrolytic type and requires no external source of current.

The invention will be fully described hereinafter and the features of novelty pointed out in the appended claims.

The accompanying drawing shows a diagrammatic view of a complete receiving station in which my improved detector is employed.

A vessel 1, made of glass or other suitable material, is adapted to receive the electrolyte, which consists, for instance, of dilute sulfuric acid.

Two electrodes are employed, in contact with the electrolyte 3, one of them consisting for instance of a thin platinum wire 2. The other electrode 4, which may have the same area exposed to the liquid as the electrode 2, or preferably a larger area, as shown, consists of a different metal or material from the electrode 2, so that the two electrodes together with the electrolyte will form a primary cell or battery.

The antenna 6 is the aerial conductor for receiving the waves or oscillations, and 7 is a self-induction coil which may be connected with the aerial conductor at different points so as to attune the said conductor to the number of oscillations of the transmitter. One end of the coil 7 is connected with one of the electrodes of the detector, and said electrode is further connected with one terminal of a relay or other indicating device 10, a resistance coil or choke coil 9 being interposed in the said connection. The other electrode of the detector has a connection 8 to the earth or to a counter capacity, and is also connected with the other terminal of the relay or indicator 10, a resistance coil or choke coil 11 being interposed in this connection also.

A primary battery of the character described will soon become polarized at the positive (platinum) electrode so as to generate practically no current. As soon, however, as electric oscillations reach the detector, the polarization will be partially destroyed and the cell will thus generate a current, or the current of the cell will be strengthened, such current being utilized to operate a suitable indicator such as the relay 10. An important advantage of this self-polarizing wave detector is that it will adjust itself to electric conditions and that the apparatus does not require any adjustment by means of a potentiometer or adjustable resistance such as is used when an electrolytic detector is combined with an external source of current.

The subject-matter of my present application has been described in my application for Letters Patent of the United States, filed October 3, 1903, Serial No. 175,600, but is not now claimed therein.

I claim as my invention:

1. A receiver for wireless telegraphy comprising an electrolyte, electrodes of different materials in contact therewith to form a primary battery, a circuit connected with said electrodes and an indicator influenced by variations of current in said circuit.

2. A receiver for wireless telegraphy comprising an electrolyte, electrodes of different materials in contact therewith and an aerial conductor connected with one of said electrodes, a circuit connected with both electrodes, and an indicator influenced by the variations of the current in said circuit.

3. A receiver for wireless telegraphy, comprising an electrolyte, electrodes of different materials and of different sizes in contact with said electrolyte, a circuit connected with said electrodes, and an indicator influenced by variations of current in said circuit.

4. In a wireless signaling system, receiving apparatus comprising a receiving-conductor, a source of electrical energy comprising an electrochemical cell associated therewith as a wave-responsive device, and a local circuit connected in shunt to said wave-responsive device and including a signal-translating instrument.

5. In a wireless signaling system, receiving apparatus comprising a receiving-conductor, a primary cell associated therewith as a wave-responsive device, and a local circuit connected in shunt to said wave-responsive device and including a signal-translating instrument.

6. In a wireless signaling system, a receiving-conductor, a primary cell associated therewith as a wave-responsive device, an element of said cell having a small area of contact with the excitant, and a local circuit connected in shunt to said cell and including a signal-translating instrument.

7. In a wireless signaling system, receiving-apparatus comprising a receiving-conductor, a primary cell associated therewith as a wave-responsive device, an element of said cell being chemically inert with respect to the excitant and whose area of contact with the excitant is small, and a local circuit connected in shunt to said cell and including a signal-translating instrument.

8. In a wireless signaling system, receiving apparatus comprising a receiving-conductor, a primary cell associated therewith as a wave-responsive device, an element of said cell consisting of platinum and having small area of contact with the excitant, and a local circuit connected in shunt to said cell and including a signal-translating instrument.

9. In a wireless signaling system, receiving apparatus comprising a receiving-circuit, a source of electric energy comprising an electrochemical cell associated with said circuit as a wave-responsive device, a local circuit, and a signal-translating instrument included therein, said wave-responsive device being common to said receiving-circuit and to said local circuit.

10. In a wireless signaling system, receiving apparatus comprising a receiving-circuit, a primary cell associated therewith as a wave-responsive device, a local circuit, and a signal-translating instrument included therein, said cell being common to said receiving and local circuits.

11. In a wireless signaling system, receiving apparatus comprising an aerial conductor, a circuit associated therewith in conductive relation, a wave-responsive device comprising a primary cell included in said circuit, a local circuit, and a signal-translating instrument included therein, said primary cell being common to both said circuits.

12. In a wireless signaling system, receiving apparatus comprising an aerial conductor, an inductance connected between said aerial conductor and earth, a circuit associated with said aerial conductor in conductive relation, a wave-responsive device comprising a primary cell included in said circuit, a local circuit including said primary cell, and a signal-translating instrument included in said local circuit.

In testimony whereof, I have hereunto set my hand in the presence of two subscribing witnesses.

WILHELM SCHLOEMILCH.

Witnesses:
 HENRY HASPER,
 WOLDEMAR HAUPT.